US006889237B2

(12) United States Patent
Acharya

(10) Patent No.: US 6,889,237 B2
(45) Date of Patent: *May 3, 2005

(54) TWO-DIMENSIONAL PYRAMID FILTER ARCHITECTURE

(75) Inventor: Tinku Acharya, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 559 days.

This patent is subject to a terminal disclaimer.

(21) Appl. No.: 09/823,212

(22) Filed: Mar. 30, 2001

(65) Prior Publication Data

US 2002/0161807 A1 Oct. 31, 2002

(51) Int. Cl.[7] .............................................. G06F 17/10
(52) U.S. Cl. ...................................... 708/308; 708/319
(58) Field of Search ................................. 708/308, 319

(56) References Cited

U.S. PATENT DOCUMENTS

| | | |
|---|---|---|
| 4,674,125 A | 6/1987 | Carlson et al. |
| 4,703,514 A | 10/1987 | Van Der Wal |
| 4,829,378 A | 5/1989 | LeGall |
| 5,359,674 A | 10/1994 | van der Wal |
| 5,561,617 A | 10/1996 | Van Der Wal |
| 5,875,122 A | 2/1999 | Acharya |
| 5,995,210 A | 11/1999 | Acharya |
| 6,009,201 A | 12/1999 | Acharya |
| 6,009,206 A | 12/1999 | Acharya |
| 6,047,303 A | 4/2000 | Acharya |
| 6,091,851 A | 7/2000 | Acharya |
| 6,094,508 A | 7/2000 | Acharya et al. |
| 6,108,453 A | 8/2000 | Acharya |
| 6,124,811 A | 9/2000 | Acharya et al. |
| 6,130,960 A | 10/2000 | Acharya |
| 6,151,069 A | 11/2000 | Dunton et al. |
| 6,151,415 A | 11/2000 | Acharya et al. |

(Continued)

OTHER PUBLICATIONS

U.S. Appl. No. 09/817,711, filed Mar. 26, 2001, Tinku Acharya.
U.S. Appl. No. 09/823,390, filed Mar. 30, 2001, Tinku Acharya.
K.R. Castleman, et al., "Simplified Design of Steerable Pyramid Filters", Perceptive Scientific Instruments, Inc., League City, TX, 1998 IEEE, XP 10289971, pp. 329–332.
PCT International Search Report dated Aug. 11, 2003 (in connection with P11276PCT, International Application No. PCT/US 02/10166).
Tinku Acharya, "A High Speed Reconfigurable Integrated Architecture for DWT", Intel Corporation, Chandler, Arizona, 1997 IEEE (pp. 669–673).
S. T. Olson, et al., "Controlling the Diameter of Openings Through Molded Plastic Members", IBM Technical Disclosure Bulletin vol. 25, No. 4, Sep. 1982 XP–001050266.

(Continued)

Primary Examiner—D. H. Malzahn
(74) Attorney, Agent, or Firm—Blakely, Sokoloff, Taylor & Zafman LLP

(57) ABSTRACT

Implementations of a two-dimensional pyramid filter are disclosed including a two-dimensional pyramid filter architecture of an order 2N–1, where N is a positive integer greater than three. The two-dimensional pyramid filter architecture of order 2N–1 may include one-dimensional pyramid filters of order 2N–1, a first summer circuit; and a second summer circuit. The two dimensional pyramid filter architecture of order 2N–1 may produce, in operation on respective clock cycles, at least a pyramid filtered output signal corresponding to the summation by the first summer circuit of output signals produced by four one-dimensional pyramid filters of order 2N–1, and a pyramid filtered output signal corresponding to an output signal produced by summing signal sample matrices of order [2(N–1)–1] in the second summer circuit. The respective pyramid filtered output signals of the two dimensional pyramid filter architecture may be summed by the third summer circuit on respective clock cycles.

17 Claims, 9 Drawing Sheets

U.S. PATENT DOCUMENTS

| | | | |
|---|---|---|---|
| 6,154,493 A | 11/2000 | Acharya et al. | |
| 6,166,664 A | 12/2000 | Acharya | |
| 6,178,269 B1 | 1/2001 | Acharya | |
| 6,195,026 B1 | 2/2001 | Acharya | |
| 6,201,613 B1 * | 3/2001 | Zhang et al. | 358/1.9 |
| 6,215,908 B1 | 4/2001 | Pazmino et al. | |
| 6,215,916 B1 | 4/2001 | Acharya | |
| 6,229,578 B1 | 5/2001 | Acharya et al. | |
| 6,233,358 B1 | 5/2001 | Acharya | |
| 6,236,433 B1 | 5/2001 | Acharya et al. | |
| 6,236,765 B1 | 5/2001 | Acharya | |
| 6,269,181 B1 | 7/2001 | Acharya | |
| 6,275,206 B1 | 8/2001 | Tsai et al. | |
| 6,285,796 B1 | 9/2001 | Acharya et al. | |
| 6,292,114 B1 | 9/2001 | Tsai et al. | |
| 6,301,392 B1 | 10/2001 | Acharya | |
| 6,348,929 B1 | 2/2002 | Acharya et al. | |
| 6,351,555 B1 | 2/2002 | Acharya et al. | |
| 6,356,276 B1 | 3/2002 | Acharya | |
| 6,366,692 B1 | 4/2002 | Acharya | |
| 6,366,694 B1 | 4/2002 | Acharya | |
| 6,373,481 B1 | 4/2002 | Tan et al. | |
| 6,377,280 B1 | 4/2002 | Acharya et al. | |
| 6,381,357 B1 | 4/2002 | Tan et al. | |
| 6,392,699 B1 | 5/2002 | Acharya | |
| 6,449,380 B1 | 9/2002 | Acharya et al. | |
| 6,535,648 B1 | 3/2003 | Acharya | |
| 6,567,564 B1 * | 5/2003 | van der Wal | 382/260 |
| 2003/0113031 A1 * | 6/2003 | Wal | 382/260 |

OTHER PUBLICATIONS

Gooitzen S. van der Wal, et al., "A VLSI Pyramid Chip for Multiresolution Image Analysis", International Journal of Computer Vision 8 (1992) Sep., No. 3, Norwell, MA, USA XP–000328805.

Peter J. Burt, et al., "The Laplacian Pyramid As a Compact Image Code", IEEE Transactions on Communications, vol. Com–31, No. 4, Apr. 1983, XP–000570701, 5pgs.

Sahinoglou, et al., "A High–Speed Pyramid Image Coding Algorithm for a VLSI Implementation", IEEE Transactions of Circuits and Systems for Video Technology, vol. 1, No. 4, NY, Dec. 1991, XP–000249319, pp. 369–374.

Dongning Li, "Minimum Number of Adders for Implementing a Multiplier and Its Application to the Design of Multiplierless Digital Filters", IEEE Transactions on Circuits and Systems II: Analog and Digital Signal Processing, No. 7, NY, Jul. 1995, pp. 453–460.

Dempster, et al., "Comments on Minimum Number of Adders for Implementing a Multiplier and Its Application to the Design of Multiplierless Digital Filters", Analog and Digital Signal Processing, vol. 45, No. 2, IEEE Feb. 1998, XP–000771370, pp. 242–243.

Jaehne B., "Digitale Bildverarbeitung", 1991, Springer–Verlag, Berlin Heidelberg, NY, XP–002208396, pp. 107–111.

Abeysekera, S., et al., "Design of Multiplier Free FIR Filters Using a LADF Sigma–Delta Modulator", 2000 IEEE, pp. 65–68, vol. 2, XP001050266.

Acharya, "A Memory Based VLSI Architectre for Image Compression" U.S. Appl. No. 08/885,415, filed Jun. 3, 1997, No. pp. 37.

Bawolek, et al., "Infrared Correction System", U.S. Appl. No. 09/126,203, filed Jul. 30, 1998, No. pp. 23.

Pazmino,et al., "Method of Compressing and/or Decompressing a Data Set Using Significance Mapping", U.S. Appl. No. 09/151,336, filed Sep. 11, 1998, No. pp. 25.

Tan,et al., "Reduction of Ringing Artifacts After Decompression OD A DWT–Based Compressed Image", U.S. Appl. No. 09/165,511, filed Oct. 2, 1998, No. pp. 20.

Tan,et al., "Robust Sequential Approach in Detecting Defective Pixels Within an Image Sensors", U.S. Appl. No. 09/191,310, filed Oct. 13, 1998, No. pp. 35.

Acharya,et al., "Color Interpolation for a Four Color Mosaic Pattern",U.S. Appl. No. 09/197,836, filed Nov. 24, 1998, No. pp. 26.

Acharya, "Enhancing Image Compression Performance by Morphological Processing", U.S. Appl. No. 09/297,810, filed Apr. 14, 1999, No. pp. 30.

Tan,et al., "Using an Electronic Camera to Build a File Containing Text",U.S. Appl. No. 09/301,753, filed Apr. 29, 1999, No. pp. 21.

Tsai, et.al., "Method and Apparatus for Adaptively Sharpening an Image", U.S. Appl. No. 09/320,192, filed May 26, 1999 No. pp. 29.

Tan,et al., "Method and Apparatus for Adaptively Sharpening Local Image Content of an Image", U.S. Appl. No. 09/328,935, filed Jun. 9, 1999, No. pp. 29.

Tan, et al., "A Hardware Efficient Wavelet–Based Video Compression Scheme", U.S. Appl. No. 042,390.P6529, filed Jun. 29, 1999, No. pp. 32.

Acharya, et al., "Model–Based Video Image Coding", U.S. Appl. No. 09/608,991, filed Jun. 30, 2000, No. pp. 36.

Acharya,et al., "Image Processing Method and Apparatus", U.S. Appl. No. 09/359,523, filed Jul. 23, 1999, No. pp. 16.

Tan,et al., "A Methodology for Color Correction with Noise Regulation", U.S. Appl. No. 09/359,831, filed Jul. 23, 1999, No. pp. 29.

Acharya, "Discrete Filter", U.S. Appl. No. 09/432,337, filed Sep. 2, 1999, No. pp. 22.

Acharya, et al., "Zerotree Encoding of Wavelet Data", U.S. Appl. No. 09/390,255, filed Sep. 3, 1999, No. pp. 25.

Acharya, et al., "A Fuzzy Based Thresholding Technique for Image Segementation", U.S. Appl. No. 09/393,136, filed Sep. 10, 1999, No. pp. 28.

Acharya,et al., "A Fuzzy Distinction Based Thresholding Technique for Image Segmentation", U.S. Appl. No. 09/393,017, filed Sep. 10, 1999, No. pp. 29.

Acharya"Video Motion Estimation", U.S. Appl. No. 09/406,032, filed Sep. 27, 1999, No. pp. 24.

Acharya, et al., "Method of Compressing a Color Image", U.S. Appl. No. 09/411,697, filed Oct. 1, 1999, No. pp. 26.

Acharya, et al, Method of Interpolating Color Pixel Signals from a Subsampled Color Image, U.S. Appl. No. 09/410,800, filed Oct. 1, 1999, No. pp. 20.

Acharya, et al., "Square Root Raised Cosine Symmetric Filter for Mobile Telecommunications", U.S. Appl. No. 09/429,058, filed Oct. 29, 1999, No. pp. 26.

Acharya, et al., "Indexing Wavelet Compressed Video for Efficient Data Handeling", U.S. Appl. No. 09/438,091, filed Nov. 10, 1999, No. pp. 29.

Metz,et al., "Image Processing Architecture", U.S. Appl. No. 09/473,643, filed Nov. 18, 1999, No. pp. 15.

Acharya, "Method of Upscaling a Color Image", U.S. Appl. No. 09/461,080, filed Dec. 14, 1999, No. pp. 22.

Acharya, "Method of Converting a Sub–Sampled Color Image", U.S. Appl. No. 09/461,068, filed Dec. 14, 1999, No. pp. 22.

Acharya,et al., "Chip Rate Selectable Square Root Raised Cosine Filter for Mobile Telecommunications", U.S. Appl. No. 09/467,487, filed Dec. 20, 1999, No. pp. 44.

Miao, et al., "Dual Mode Filter for Mobile Telecommunications", U.S. Appl. No. 09/467,611, filed Dec. 20, 1999, No. pp. 49.

Acharya, "A Block–Matching Algorithm for Color Interpolation", U.S. Appl. No. 09/494,087, filed Jan. 28, 2000, No. pp. 35.

Acharya, et al., "A Method of Inverse Quantizing Signals Samples of an Image During Image Decompression", filed Feb. 18, 2000, No. pp. 32.

Acharya, et al., "A Method of Quantizing Signal Samples of an Image During Image Compression",U.S. Appl. No. 09/507,399, filed Feb. 18, 2000, No. pp. 24.

Acharya, et al, "Method of Intergrating a Watermark into an Image" U.S. Appl. No. 09/519,874, filed Mar. 6, 2000, No. pp. 27.

Acharya, et al., "Method of Using Hue to Interpolate Color Pixel Signals", U.S. Appl. No. 09/591,867, filed Jun. 12, 2000, No. pp. 23.

Kim, et al., "Method of Performing Motion Estmation", U.S. Appl. No. 09/596,127, filed Jun. 16, 2000, No. pp. 29.

Dunton,et al., "Dual Mode Digital Camera for Video and Still Operation", U.S. Appl. No. 09/595,055, filed Jun. 16, 2000, No. pp. 30.

Acharya, et al., "Method of Compressing an Image", U.S. Appl. No. 09/597,354, filed Jun. 19, 2000, No. pp. 23.

Acharya, et al., "Method of Video Coding the Movement of a Human Face from a Sequence of Images", U.S. Appl. No. 09/608,989, filed Jun. 30, 2000, No. pp. 25.

Acharya, et al., "Method of Video Coding Shoulder Movement from a Sequence of Images", U.S. Appl. No. 09/607,724, filed Jun. 30, 2000, No. pp. 24.

Acharya, "Techniques to Implement Two–Dimensional Compression", U.S. Appl. No. 09/664,131, filed Sep. 18, 2000, No. pp. 24.

Acharya, "Techniquies to Implement One–Dimensional Compression", U.S. Appl. No. 09/666,486, filed Sep. 18, 2000, No. pp. 18.

Acharya, "Sad Computation Architeceure", U.S. Appl. No. 09/677,829, filed Sep. 29, 2000, No. pp. 24.

Acharya, et al., "A Method of Generating Huffman Code Length Information", U.S. Appl. No. 09/704,392, filed Oct. 31, 2000, No. pp. 25.

Acharya, et al., "A Method of Performing Huffman Decoding", No. Appl. No. 09/704,380, filed Oct. 31, 2000, No. pp. 26.

Acharya, "Method and Apparatus for Two–Dimensional Separable Symmetric Filtering", U.S. Appl. No. 09/713,663, filed Nov. 15, 2000, No. pp. 20.

Acharya, "Method and Apparatus for Multiply–Accumulate Two–Dimensional Sejparable Symmetric Filtering", U.S. Appl. No. 09/718,877, filed Nov. 20, 2000, No. pp. 13.

Acharya, et al., "Developing an Euler Vector for Images", U.S. Appl. No. 09/722,979, filed Nov. 27, 2000, No. pp. 45.

Acharya, et al., "Computing the Euler Number of a Binary Image" U.S. Appl. No. 09/722,982, filed Nov. 27, 2000, No. pp. 31.

Acharya, et al, "Wavelet Coding of Video", U.S. Appl. No. 09/722,988, filed Nov. 27, 2000, No. pp. 40.

Acharya, et al., Encoding fo Wavelet Transformed Error Data, U.S. Appl. No. 09/723,123, filed Nov. 27, 2000, No. pp. 38.

Acharya, et al., "Imaging Device Connected to Processor–Based System Using High–Bandwidth Bus", U.S. Appl. No. 09/726,773, filed Nov. 29, 2000, No. pp. 31.

Acharya, et al., "A Method for Block–Based Digital Image Watermaking", U.S. Appl. No. 09/727,288, filed Nov. 29, 2000, No. pp. 11.

Acharya, et al., "Color Filter Array and Color Interpolation Algorithm", U.S. Appl. No. 09/727,038, filed Nov. 30, 2000, No. pp. 36.

Acharya, et al., "Method of Generating a Length–Contrained Huffman Code", U.S. Appl. No. 09/705,314, filed Nov. 30, 2000, No. pp. 17.

Kim, et al., "Method of Performing Video Encoding Rate Control", U.S. Appl. No. 09/754,227, filed Jan. 3, 2001, No. pp. 28.

Kim,et al., "Method of Performing Video Encoding Rate Control Using Motion Estimation", U.S. Appl. No. 09/754,683, filed Jan. 3, 2001, No. pp. 27.

Kim,et al., "Method of Performing Video Encoding Rate Control Using Bit Budget", U.S. Appl. No. 09/754,682, filed Jan. 3, 2001, No. pp. 25.

* cited by examiner

FIG. 4

$$P^{k\times k} = \begin{bmatrix} P^{k\times k}_{0,0} & P^{k\times k}_{0,1} & \cdot & \cdots & \cdot & \cdot & P^{k\times k}_{0,N-1} \\ P^{k\times k}_{1,0} & P^{k\times k}_{1,1} & \cdot & \cdot & \cdot & \cdot & P^{k\times k}_{1,N-1} \\ \cdot & \cdot & \cdot & \cdot & \cdot & \cdot & \cdot \\ \vdots & \cdot & \cdot & P^{k\times k}_{i,j} & \cdot & \cdot & \vdots \\ \cdot & \cdot & \cdot & \cdot & \cdot & \cdot & \cdot \\ \cdot & \cdot & \cdot & \cdot & \cdot & \cdot & \cdot \\ P^{k\times k}_{M-1,0} & P^{k\times k}_{M-1,1} & \cdot & \cdots & \cdot & \cdot & P^{k\times k}_{M-1,N-1} \end{bmatrix}$$

FIG. 5

$$S = \begin{bmatrix} s_{0,0} & s_{0,1} & \cdot & \cdots & \cdot & \cdot & s_{0,N-1} \\ s_{1,0} & \cdot & \cdot & \cdot & \cdot & \cdot & s_{1,N-1} \\ \cdot & \cdot & s_{i-1,j-1} & s_{i-1,j} & s_{i-1,j+1} & \cdot & \cdot \\ \vdots & \cdot & s_{i,j-1} & s_{i,j} & s_{i,j+1} & \cdot & \vdots \\ \cdot & \cdot & s_{i+1,j-1} & s_{i+1,j} & s_{i+1,j+1} & \cdot & \cdot \\ \cdot & \cdot & \cdot & \cdot & \cdot & \cdot & \cdot \\ s_{M-1,0} & s_{M-1,1} & \cdot & \cdots & \cdot & \cdot & s_{M-1,N-1} \end{bmatrix}$$

$$F_{k \times k} = \begin{bmatrix} 1 \\ 2 \\ 3 \\ \vdots \\ \frac{k-1}{2} \\ \vdots \\ 3 \\ 2 \\ 1 \end{bmatrix} * \begin{bmatrix} 1 & 2 & 3 & \cdots & \frac{k-1}{2} & 4 & 3 & 2 & 1 \end{bmatrix}$$

$$= \begin{bmatrix} 1 & 2 & 3 & \cdots & \frac{k-1}{2} & \cdots & 3 & 2 & 1 \\ 2 & 4 & 6 & \cdots & \frac{2(k-1)}{2} & \cdots & 6 & 4 & 2 \\ 3 & 6 & 9 & \cdots & \frac{3(k-1)}{2} & \cdots & 9 & 6 & 3 \\ \vdots & \vdots & \vdots & \vdots & \vdots & \vdots & \vdots & \vdots & \vdots \\ \frac{k-1}{2} & \frac{2(k-1)}{2} & \frac{3(k-1)}{2} & \cdots & \frac{(k-1)*(k-1)}{4} & \cdots & \frac{3(k-1)}{2} & \frac{2(k-1)}{2} & \frac{k-1}{2} \\ \vdots & \vdots & \vdots & \vdots & \vdots & \vdots & \vdots & \vdots & \vdots \\ 3 & 6 & 9 & \cdots & \frac{3(k-1)}{2} & \cdots & 9 & 6 & 3 \\ 2 & 4 & 6 & \cdots & \frac{2(k-1)}{2} & \cdots & 6 & 4 & 2 \\ 1 & 2 & 3 & \cdots & \frac{k-1}{2} & \cdots & 3 & 2 & 1 \end{bmatrix}$$

FIG. 6

$$F_{9x9} = \begin{bmatrix} 1 \\ 2 \\ 3 \\ 4 \\ 5 \\ 4 \\ 3 \\ 2 \\ 1 \end{bmatrix} * \begin{bmatrix} 1 & 2 & 3 & 4 & 5 & 4 & 3 & 2 & 1 \end{bmatrix} = \begin{bmatrix} 1 & 2 & 3 & 4 & 5 & 4 & 3 & 2 & 1 \\ 2 & 4 & 6 & 8 & 10 & 8 & 6 & 4 & 2 \\ 3 & 6 & 9 & 12 & 15 & 12 & 9 & 6 & 3 \\ 4 & 8 & 12 & 16 & 20 & 16 & 12 & 8 & 4 \\ 5 & 10 & 15 & 20 & 25 & 20 & 15 & 10 & 5 \\ 4 & 8 & 12 & 16 & 20 & 16 & 12 & 8 & 4 \\ 3 & 6 & 9 & 12 & 15 & 12 & 9 & 6 & 3 \\ 2 & 4 & 6 & 8 & 10 & 8 & 6 & 4 & 2 \\ 1 & 2 & 3 & 4 & 5 & 4 & 3 & 2 & 1 \end{bmatrix}$$

FIG. 7

$$P^{1 \times k} = \begin{bmatrix} P^{1 \times k}_{0,0} & P^{1 \times k}_{0,1} & \cdot & \cdots & \cdot & \cdot & P^{1 \times k}_{0,N-1} \\ P^{1 \times k}_{1,0} & P^{1 \times k}_{1,1} & \cdot & \cdot & \cdot & \cdot & P^{1 \times k}_{1,N-1} \\ \cdot & \cdot & \cdot & \cdot & \cdot & \cdot & \cdot \\ \vdots & & \cdot & P^{1 \times k}_{i,j} & \cdot & \cdot & \vdots \\ \cdot & \cdot & \cdot & \cdot & \cdot & \cdot & \cdot \\ \cdot & \cdot & \cdot & \cdot & \cdot & \cdot & \cdot \\ P^{1 \times k}_{M-1,0} & P^{1 \times k}_{M-1,1} & \cdot & \cdots & \cdot & \cdot & P^{1 \times k}_{M-1,N-1} \end{bmatrix}$$

FIG. 8

$$P^{kx1} = \begin{bmatrix} P_{0,0}^{kx1} & P_{0,1}^{kx1} & \cdot & \cdots & \cdot & \cdot & P_{0,N-1}^{kx1} \\ P_{1,0}^{kx1} & P_{1,1}^{kx1} & \cdot & \cdot & \cdot & \cdot & P_{1,N-1}^{kx1} \\ \cdot & \cdot & \cdot & \cdot & \cdot & \cdot & \cdot \\ \vdots & & \cdot & P_{i,j}^{kx1} & \cdot & \cdot & \vdots \\ \cdot & \cdot & \cdot & \cdot & \cdot & \cdot & \cdot \\ \cdot & \cdot & \cdot & \cdot & \cdot & \cdot & \cdot \\ P_{M-1,0}^{kx1} & P_{M-1,1}^{kx1} & \cdot & \cdots & \cdot & \cdot & P_{M-1,N-1}^{kx1} \end{bmatrix}$$

FIG. 9

TWO-DIMENSIONAL PYRAMID FILTER ARCHITECTURE

RELATED APPLICATIONS

This patent application is related to U.S. patent application Ser. No. 09/754,684, titled "Multiplierless Pyramid Filter," filed Jan. 3, 2001, by Tinku Acharya; U.S. patent application Ser. No. 09/823,212, titled "Two-Dimensional Pyramid Filter Architecture," filed Mar. 26, 2001, by Tinku Acharya; U.S. patent application Ser. No. 09/820,108, titled "Pyramid Filter," filed Mar. 28, 2001, by Tinku Acharya; and concurrently filed U.S. patent application Ser. No. 09/823,390, titled "Two-Dimensional Pyramid Filter Architecture," filed Mar. 30, 2001, by Tinku Acharya, all assigned to the assignee of the presently claimed subject matter and herein incorporated by reference.

BACKGROUND

This disclosure is related to pyramid filters.

In image processing it is often desirable to decompose an image, such as a scanned color image, into two or more separate image representations. For example, a color or gray-scale document image can be decomposed into background and foreground images for efficient image processing operations, such as enhancement, compression, etc., as are at times applied in a typical photocopying machine or scanner device. In this context, this operation is often referred to as a descreening operation. This descreening is also sometimes applied to remove halftone patterns that may exist in an original scanned image. For example, these halftone patterns may cause objectionable artifacts for human eyes if not properly removed. The traditional approach for this decomposition or descreening is to filter the color image in order to blur it. These blurred results are then used to assist in determining how much to blur and sharpen the image in order to produce the decomposition. Typically this blurring can be achieved using a "symmetric pyramid" filter. Symmetric pyramid finite impulse response (FIR) filters are well-known.

One disadvantage of this image processing technique, however, is that the complexity increases many fold when a number of pyramid filters of different sizes are applied in parallel in order to generate multiple blurred images, to apply the technique as just described. A brute force approach for this multiple pyramid filtering approach is to use multiple FIR filters in parallel, as illustrated in FIG. 1. Such an approach demonstrates that the design and implementation of fast "symmetric pyramid filtering" architectures to generate different blurred images in parallel from a single source image may be desirable.

The numbers provided in parenthesis for each FIR block in FIG. 1 represents the pyramid filter of corresponding length. For example, (1, 2, 1) are the filter coefficients for a symmetric pyramid finite impulse response (FIR) filter of order or length 3. Likewise, (1, 2, 3, 2, 1) are the coefficients for an FIR pyramid filter of order 5, (1, 2, 3, 4, 3, 2, 1) are the coefficients for an FOR filter of order 7, and so forth.

Unfortunately, the approach demonstrated in FIG. 1 has disadvantages. For example, inefficiency may result from redundant computations. Likewise, FIR implementations frequently employ multiplier circuits. While implementations exist to reduce or avoid the use of multipliers, such as with shifting and summing circuitry, that may then result in increased clocking and, hence, may reduce circuit throughput. A need, therefore, exists for improving pyramid filtering implementations or architectures.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and appendages thereof, may best be understood by reference of the following detailed description when read with the accompanying drawings in which:

FIG. 4 is a table/matrix showing an example of a matrix that may result from implementing a two-dimensional pyramid filter architecture, such as one that may be implemented by the embodiment of FIG. 3;

FIG. 5 is a table/matrix showing an example of a two-dimensional signal that may be operated upon by a two-dimensional pyramid filter architecture;

FIG. 6 is a table/matrix showing an example of applying a one-dimensional pyramid filter kernel both row-wise and column-wise;

FIG. 7 is the table/matrix of FIG. 6 for k=9;

FIG. 8 is a table/matrix showing the result of applying a one-dimensional pyramid filter to the rows of a two-dimensional input signal sample matrix; and FIG. 9 is a table/matrix showing the result of applying a one-dimensional pyramid filter to the columns of a two-dimensional input signal sample matrix.

DETAILED DESCRIPTION

In the following detailed description, numerous specific details are set forth in order to provide a thorough understanding of the claimed subject matter. However, it will be understood by those skilled in the art that the claimed subject matter may be practiced without these specific details. In other instances, well-known methods, procedures, components and circuits have not been described in detail in order so as not to obscure the claimed subject matter.

As previously described, pyramid filtering, in particular, symmetric pyramid filtering, may be employed in connection with color images or color image processing in order to decompose or descreen the image, such as into a background and foreground image, for example. Although the claimed subject matter is not limited in scope in this respect, in such a context, pyramid filtering architectures that reduce computational complexity or processing and/or hardware cost are particularly desirable. Likewise, implementations that are Multiplierless, that is do not specifically employ multiplication in the implementation, are also desirable usually because such implementations or embodiments are cheaper to implement than those that employ or include multiplier circuits.

Figure 1:
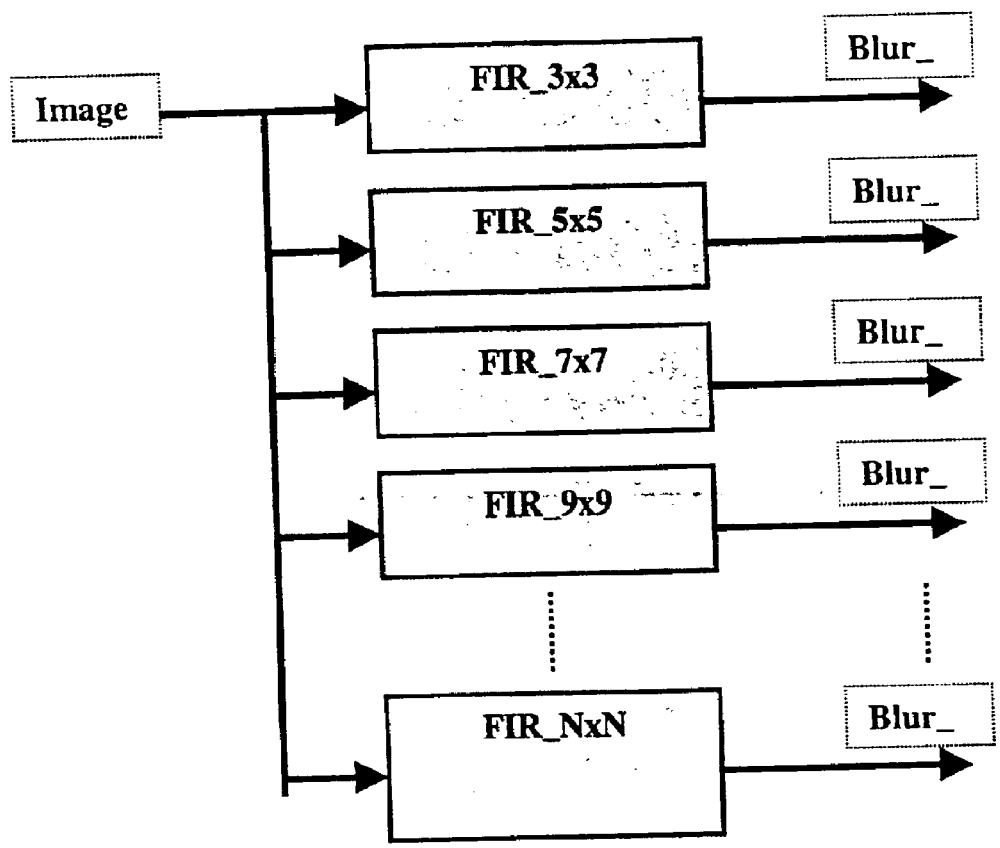
FIG. 1 is a block diagram illustrating a brute force approach to implementing a finite impulse response (FIR) multiple pyramid filtering architecture.
Figure 2:
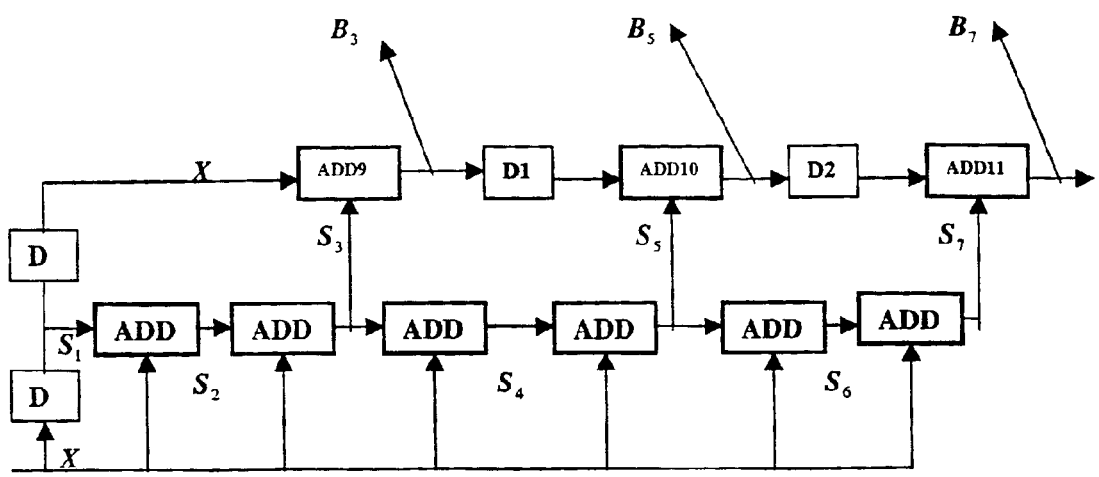
FIG. 2 is one embodiment of a one-dimensional multiplierless pyramid filter.

Although the claimed scope is not limited in scope in this respect, FIG. 2 illustrates an embodiment 200 of a one-dimensional pyramid filter, such as described in more detail in aforementioned U.S. patent application Ser. No. 09/754,684, titled "Multiplierless Pyramid Filter," by T. Acharya filed on Jan. 3, 2001. Embodiment 200 comprises a unified multiplierless cascaded symmetric pyramid filtering architecture to generate a multiple number of filtered output signal streams for a series or sequence of pyramid filters having different orders, the generation of the output signal streams occurring in parallel. In this particular embodiment, although, again, the claimed subject matter is not limited in scope in this respect, a filtered output signal stream is produced on every clock cycle for each pyramid filter of a different order being implemented. Therefore, in addition to being computationally efficient, this particular embodiment produces good results in terms of throughput. However, as previously indicated, this particular embodiment implements a one-dimensional pyramid filter.

FIG. 2 is understood in the context of specific notation. For example, an input source signal, X, may be designated as follows:

$$X=(x_0, x_1, \ldots, x_{i-2}, x_{i-1}, x_i, x_{i+1}, x_{i+2}, \ldots)$$

In digital or discrete signal processing, filtering may be expressed as a convolution, $\circledx$, of the input signal, X, and a filter, F, in this context a digital filter of finite length, referred to here as a finite impulse response (FIR) filter. Therefore, the filtered output signal stream is indicated as follows:

$$Y=X \circledx F$$

As previously described, the particular embodiment in FIG. 2 employs pyramid filters. These filters are typically implemented using digital filters of lengths or orders that are odd, such as 3, 5, 7, 9, etc. Odd numbers or orders, in this context, may be expressed in the form $2N-1$, where N is a positive integer greater than two, for example. Some examples of such digital filters are as follows:

$F_3=(1, 2, 1)$
$F_5=(1, 2, 3, 2, 1)$
$F_7=(1, 2, 3, 4, 3, 2, 1)$
$F_9=(1, 2, 3, 4, 5, 4, 3, 2, 1)$
...
$F_M=(1, 2, 3, \ldots, N, \ldots 3, 2, 1)$ (where, in this context, $M=2N-1$)

For the foregoing filters, the filtered output signals or output signal streams may be represented as follows:

$B^3 = X \circledx F_3 = (b_0^3, b_1^3, \ldots, b_{i-1}^3, b_i^3, b_{i+1}^3, \ldots)$ result of input signal X filtered by $F_3$ $B^5 = X \circledx F_5 = (b_0^5, b_1^5, \ldots, b_{i-1}^5, b_i^5, b_{i+1}^5, \ldots)$ result of input signal X filtered by $F_5$ $B^7 = X \circledx F_7 = (b_0^7, b_1^7, \ldots, b_{i-1}^7, b_i^7, b_{1+1}^7, \ldots)$ result of input signal X filtered by $F_7$ $B^9 = X \circledx F_9 = (b_0^9, b_1^9, \ldots, b_{i-1}^9, b_i^9, b_{i+1}^9, \ldots)$ result of input signal X filtered by $F_9$ $B^M = X \circledx F_M (b_0^M, b_1^M, \ldots, b_{i-1}^M, b_i^M, b_{i+1M}, \ldots)$ result of input signal X filtered by $F_M$ An alternate way to empirically represent these filtered output signal samples is as follows:

$$b_i^3 = x_{i-1} + 2x_i + x_{i+1}$$

$$b_i^5 = x_{i-2} + 2x_{i-1} + 3x_i + 2x_{i+1} + x_{i+2}$$

$$b_i^7 = x_{i-3} + 2x_{i-2} + 3x_{i-1} + 4x_i + 3x_{i+1} + 2x_{i+2} + x_{i+3}$$

$$b_i^9 = x_{i-4} + 2x_{i-3} + 3x_{i-2} + 4x_{i-1} + 5x_i + 4x_{i+1} + 3x_{i+2} + 2x_{i+3} + x_{i+4}$$

Likewise, by introducing what is referred to, in this context, as state variables, the above expressions may be re-expressed as follows:

$b_i^3 = x_i + s_i^3$, where $s_i^3 = x_{i-1} + x_i + x_{i+1}$ $b_i^5 = b_i^3 + s_i^5$, where $s_i^5 = x_{i-2} + x_{i-1} + x_i + x_{i+1} + x_{i+2}$ $b_i^7 = b_i^5 + s_i^7$, where $s_i^7 = x_{i-3} + x_{i-2} + x_{i-1} + x_i + x_{i+1} + x_{i+2} + x_{i+3}$ $b_i^9 = b_i^7 + s_i^9$, where $s_i^9 = x_{i-4} + x_{i-3} + x_{i-2} + x_{i-1} + x_i + x_{i+1} + x_{i+2} + x_{i+3} + x_{i+4}$ Hence, the desired pyramid filter may be expressed as follows:

$B^3 = X + S_3$, where $S_3 = (s_0^3, s_1^3, s_2^3, \ldots, s_{i-1}^3, s_i^3, s_{i+1}^3, \ldots)$ $B^5 = B^3 + S_5$, where $S_3 = (s_0^5, s_1^5, s_2^5, \ldots, s_{i-1}^5, s_i^5, s_{i+1}^5, \ldots)$ $B^7 = B^5 + S_7$, where $S_7 = (s_0^7, s_1^7, s_2^7, \ldots, s_{i-1}^7, s_i^7, s_{i+1}^7, \ldots)$ $B^9 = B^7 + S_7$, where $S_9 = (s_0^9, s_1^9, s_2^9, \ldots, s_{i-1}^9, s^9, s_{i+1}^9, \ldots)$ A study of FIG. 2 illustrates that the computed output signal streams, $B_3$, $B_5$, $B_7$, $B_9$, etc. of the pyramid filters shown in FIG. 2 are produced by the embodiment illustrated.

The previous discussion of pyramid filters occurs in the context of one-dimensional filtering; however, due at least in part to the symmetric nature of such filters, it is possible to implement pyramid two-dimensional filtering instead of computing in a row-wise and column-wise one-dimensional fashion that employs extra computational steps. If we represent the one-dimensional k-tap pyramid filter as $$F_k = \begin{bmatrix} 1 & 2 & 3 & \cdots & \dfrac{k-1}{2} & \cdots & 3 & 2 & 1 \end{bmatrix},$$

the corresponding two dimensional pyramid filter $F_{k \times k}$ may be derived as shown in FIG. 6. In FIG. 7, we have shown the two-dimensional pyramid filter kernel for k=9. Assuming a two-dimensional input signal, e.g., signal samples, having the form shown in FIG. 5, FIG. 4 is a table illustrating a matrix that may result, here a two-dimensional filtered signal sample output matrix, $P^{k \times k}$, in which the two dimensional input signal sample matrix is filtered using two-dimensional pyramid filter kernel $F_{k \times k}$.

The matrix shown in FIG. 8 may result from applying a one-dimensional k-tap pyramid filter in every row of the two-dimensional input signal sample matrix and the matrix shown in FIG. 9 may result from applying a one-dimensional k-tap pyramid filter in every column of the two-dimensional input signal sample matrix. The matrix in FIG. 4 may result from applying the two-dimensional (k×k) tap filter to the two dimensional input signal sample matrix or, alternatively, it may result from applying the one-dimensional k-tap pyramid filter row-wise and then followed by column-wise. Applying this approach to generate filtered signal samples outputs $P^{1 \times 3}$, $P^{3 \times 1}$, and $P^{3 \times 3}$, produces the following relationships:

$$P_{i,j}^{1 \times 3} = s_{i,j-1} + 2s_{i,j} + s_{i,j+1}$$

$$P_{i,j}^{3 \times 1} = s_{i-1,j} + 2s_{i,j} + s_{i+1,j}$$

$$P_{i,j}^{3 \times 3} = s_{i-1,j-1} + 2s_{i-1,j} + s_{i-1,j+1} + 2s_{i,j-1} + 4s_{i,j} + 2s_{i,j+1} + s_{i+1,j-1} + 2s_{i+1,j} + s_{i+1,j+1}$$

Generating filtered signal samples outputs $P^{1 \times 5}$, $P^{5 \times 1}$, and $P^{5 \times 5}$, produces the following relationships:

$$P_{i,j}^{5 \times 1} = s_{i-2,j} + 2s_{i-1,j} + 3s_{i,j} + 2s_{i+1,j} + s_{i+2,j}$$

$$P_{i,j}^{1 \times 5} = s_{i,j-2} + 2s_{i,j-1} + 3s_{i,j} + 2s_{i,j+1} + s_{i,j+2}$$

$$P_{i,j}^{5 \times 5} = (s_{i-2,j-2} + 2s_{i-2,j-1} + 3s_{i-2,j} + 2s_{i-2,j+1} +$$

$$s_{i-2,j+2}) + (2s_{i-1,j-2} + 4s_{i-1,j-1} + 6s_{i-1,j} + 4s_{i-1,j+1} +$$

$2s_{i-1,j+}$ $(3s_{i,j-2}+6s_{i,j-1}+9s_{i,j}+6s_{i,j+1}+3s_{i,j+2})+(2s_{i+1,j-2}+4s_{i+1,j-1}+6s_{i+1,j}+4s_{i+1,j+1}+2s_{i+1,j+2})+$ $(s_{i+2,j-2}+2s_{i+2,j-1}+3s_{i+2,j}+2s_{i+2,j+1}+s_{i+2,j+2})$

Likewise, generating filtered signal samples outputs $P^{7\times1}$, $P^{1\times7}$, and $P^{7\times7}$, produces the following relationships:

$P_{i,j}^{7\times1} = s_{i-3,j}+2s_{i-2,j}+3s_{i-1,j}+4s_{i,j}+3s_{i+1,j}+2s_{i+2,j}+s_{i+3,j}$ $P_{i,j}^{1\times7} = s_{i,j-3}+2s_{i,j-2}+3s_{i,j-1}+4s_{i,j}+3s_{i,j+1}+2s_{i,j+2}+s_{i,j+3}$ $P_{i,j}^{7\times7} = (s_{i-3,j-3}+2s_{i-3,j-2}+3s_{i-3,j-1}+4s_{i-3,j}+3s_{i-3,j+1}+2s_{i-3,j+2}+s_{i-3,j+3})+$ $(2s_{i-2,j-3}+4s_{i-2,j-2}+6s_{i-2,j-1}+8s_{i-2,j}+6s_{i-2,j+1}+4s_{i-2,j+2}+2s_{i-2,j+3})+$ $(3s_{i-1,j-3}+6s_{i-1,j-2}+9s_{i-1,j-1}+12s_{i-1,j}+9s_{i-1,j+1}+6s_{i-1,j+2}+3s_{i-1,j+3})+$ $(4s_{i,j-3}+8s_{i,j-2}+12s_{i,j-1}+16s_{i,j}+12s_{i,j+1}+8s_{i,j+2}+4s_{i,j+3})+$ $(3s_{i+1,j-3}+6s_{i+1,j-2}+9s_{i+1,j-1}+12s_{i+1,j}+9s_{i+1,j+1}+6s_{i+1,j+2}+3s_{i+1,j+3})+$ $(2s_{i+2,j-3}+4s_{i+2,j-2}+6s_{i+2,j-1}+8s_{i+2,j}+6s_{i+2,j+1}+4s_{i+2,j+2}+2s_{i+2,j+3})+$ $(s_{i+3,j-3}+2s_{i+3,j-2}+3s_{i+3,j-1}+4s_{i+3,j}+3s_{i+3,j+1}+2s_{i+3,j+2}+s_{i+3,j+3})$ Mathematical manipulation may be employed to produce the following:

$P_{i,j}^{7\times7} = (P_{i-1,j-1}^{5\times5}+P_{i-1,j+1}^{5\times5}+P_{i+1,j-1}^{5\times5}+P_{i+1,j+1}^{5\times5})-(P_{i,j-1}^{7\times1}+P_{i,j+1}^{7\times1}+P_{i-1,j}^{1\times7}+P_{i+1,j}^{1\times7})-$ $(s_{i-1,j-1}+s_{i-1,j+1}+s_{i+1,j-1}+s_{i+1,j+1})$    [1]

Figure 3:
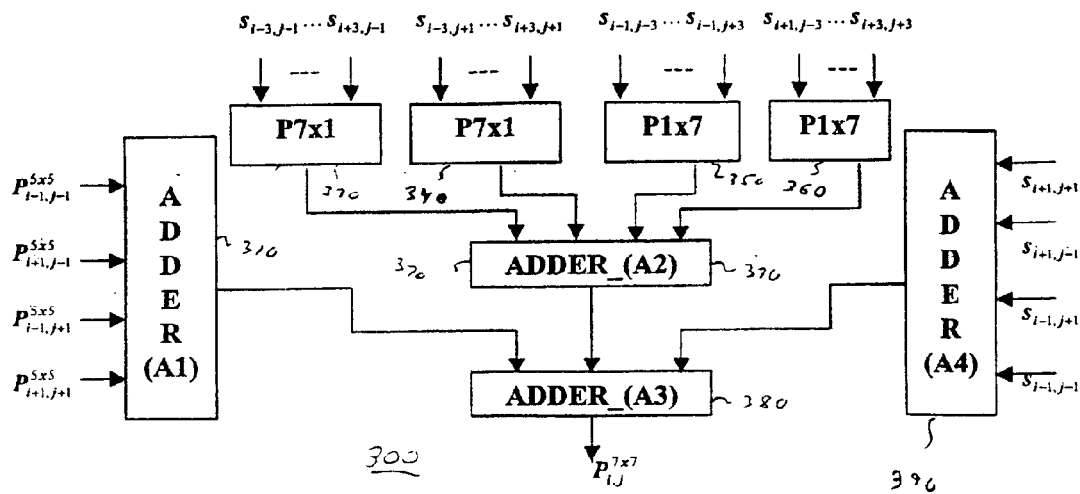
FIG. 3 is one embodiment of a two-dimensional pyramid filter architecture.

Equation [1] above illustrates that a direct two-dimensional pyramid filter architecture of order 2N−1, in this case where N is four, may potentially be implemented using either four two-dimensional pyramid filters of order [2(N−1)−1], that is five, or one two-dimensional pyramid filter of order [2(N−1)−1] using four signal sample matrices $P_{i-1,j-1}^{5\times5}$, $P_{i-1,j+1}^{5\times5}$, $P_{i+1,j-1}^{5\times5}$, $P_{i+1,j+1}^{5\times5}$ and four one-dimensional pyramid filters of order 2N−1, here seven, the filters being row-wise and column-wise, in this example. FIG. 3 is a schematic diagram illustrating such an embodiment, although, of course, the claimed subject matter is not limited in scope to this particular implementation or embodiment. For example, the output signal samples corresponding to those produced by four two-dimensional pyramid filters of order [2(N−1)−1], here order five where N is four, may not necessarily be produced by two-dimensional pyramid filters. As just one example, these output signals may be produced using one-dimensional pyramid filters. One such filter is shown in FIG. 2, although, again, additional approaches to producing the output signals for the architecture shown in FIG. 3 may also be employed.

FIG. 3 illustrates an integrated circuit (IC), 300, although, of course, alternative embodiments may not necessarily be implemented on a single integrated circuit chip. IC 300 includes a two-dimensional pyramid filter architecture of an order 2N−1, where N is a positive integer greater than three, here four, in operation, is capable of producing, on respective clock cycles, at least the following. Pyramid filtered output signals are produced corresponding to output signals produced by four one-dimensional pyramid filters of order 2N−1, again, seven in this example where N is four, 330, 340, 350, and 360 in FIG. 3. Pyramid filtered output signals are also produced corresponding to output signals produced either by four two-dimensional pyramid filters or one two-dimensional pyramid of order [2(N−1)−1] or five here, where N is four, using signal sample matrices $P_{i-1,j-1}^{5\times5}$, $P_{i-1,j+1}^{5\times5}$, $P_{i+1,j-1}^{5\times5}$, $P_{i+1,j+1}^{5\times5}$. These output signals are summed by adder 310 in FIG. 3. Likewise, the respective output signals in this two dimensional pyramid filter architecture implementation, in the implementation in FIG. 3, for example, the output signals of 330, 340, 350, and 360, are summed on respective clock cycles of the two dimensional pyramid filter architecture, by adder 370 in FIG. 3. Adder 380 sums the output signals of 310, 370, and 390. Of course, FIG. 3 is just one possible example of an implementation and the claimed subject matter is not limited in scope to this or to another particular implementation.

For example, N is not limited to four. Likewise, the pyramid filtered output signals that correspond to output signals produced by a two-dimensional pyramid filter are not limited to being implemented by one-dimensional pyramid filters or to two-dimensional pyramid filters. Likewise, as previously indicated, if one-dimensional filters are employed, then the filters are not limited to the implementation approach described in aforementioned U.S. patent application Ser. No. 09/754,684, titled "Multiplierless Pyramid Filter," filed Jan. 3, 2001, by Tinku Acharya, or in aforementioned U.S. patent application Ser. No. 09/820,108, titled "Pyramid Filter," filed on Mar. 28, 2001, by Tinku Acharya. For example, one-dimensional pyramid filters other than multiplierless pyramid filters may be employed. Likewise, depending on the implementation, different numbers of such pyramid filters and different orders of such pyramid filters may be employed. For example, the output signals may be combined or processed in a way to produce pyramid filtered output signals corresponding to pyramid filters of a different number, dimension, or order.

It will, of course, be understood that, although particular embodiments have just been described, the claimed subject matter is not limited in scope to a particular embodiment or implementation. For example, one embodiment may be in hardware, whereas another embodiment may be in software. Likewise, an embodiment may be in firmware, or any combination of hardware, software, or firmware, for example. Likewise, although the claimed subject matter is not limited in scope in this respect, one embodiment may comprise an article, such as a storage medium. Such a storage medium, such as, for example, a CD-ROM, or a disk, may have stored thereon instructions, which when executed by a system, such as a computer system or platform, or an imaging system, for example, may result in an embodiment of a method in accordance with the claimed subject matter being executed, such as an embodiment of a method of filtering or processing an image or video, for example, as previously described. For example, an image processing platform or an imaging processing system may include an image processing unit, a video or image input/output device and/or memory.

While certain features of the claimed subject matter have been illustrated and described herein, many modifications, substitutions, changes and equivalents will now occur to those skilled in the art. It is, therefore, to be understood that the appended claims are intended to cover all such modifications and changes as fall within the true spirit of the claimed subject matter.

What is claimed is:

1. An integrated circuit comprising:
a two-dimensional pyramid filter architecture of an order 2N−1, where N is a positive integer greater than three, the two-dimensional pyramid filter architecture of order 2N−1 including,
one-dimensional pyramid filters of order 2N−1,
a first summer circuit; and
a second summer circuit;
said two dimensional pyramid filter architecture of order 2N−1, in operation, capable of producing, on respective clock cycles, at least the following:
a pyramid filtered output signal corresponding to the summation by the first summer circuit of output signals produced by four one-dimensional pyramid filters of order 2N−1; and
a pyramid filtered output signal corresponding to an output signal produced by summing signal sample matrices of order [2(N−1)−1] in the second summer circuit;
wherein the respective pyramid filtered output signals in said two dimensional pyramid filter architecture are summed by a third summer circuit on respective clock cycles of said two dimensional pyramid filter architecture.

2. The integrated circuit of claim 1, wherein N is four; and
wherein said two dimensional pyramid filter architecture of order seven, in operation, capable of producing, on respective clock cycles, the pyramid filtered output signals corresponding to the summation of four signal sample matrices $p_{i-1,j-1}^{5\times 5}$, $p_{i-1,j+1}^{5\times 5}$, $p_{i+1,j-1}^{5\times 5}$, $p_{i+1,j+1}^{5\times 5}$.

3. The integrated circuit of claim 1, wherein said one-dimensional pyramid filters comprise a sequence of scalable cascaded multiplierless operational units, each of said operational units capable of producing a different order pyramid filtered output signal sample stream.

4. The integrated circuit of claim 1, wherein said one-dimensional pyramid filters comprise other than one-dimensional multiplierless pyramid filters.

5. The integrated circuit of claim 1, wherein the first summer circuit sums the output signals produced by eight one-dimensional pyramid filters of order five.

6. The integrated circuit of claim 5, wherein, of the eight one-dimensional pyramid filters of order five, four are applied row-wise and four are applied column-wise.

7. The integrated circuit of claim 5, wherein the eight one-dimensional pyramid filters of order five comprise eight one-dimensional multiplierless pyramid filters of order five.

8. The integrated circuit of claim 7, wherein, of the eight one-dimensional multiplierless pyramid filters of order five, four are applied row-wise and four are applied column-wise.

9. A method of filtering an image using a two-dimensional pyramid filter architecture of order 2N−1, where N is a positive integer greater than three, the two-dimensional pyramid filter architecture of order 2N−1 including one-dimensional pyramid filters of order 2N−1, said method comprising:
summing, on respective clock cycles of said two dimensional pyramid filter architecture, the following:
pyramid filtered output signals corresponding to output signals produced by four one-dimensional pyramid filters of order 2N−1; and
a pyramid filtered output signal corresponding to the summation of signal sample matrices of order [2(N−1)−1].

10. The method of claim 9, wherein N is four; and
wherein the signal sample matrices comprise four signal sample matrices $p_{i-1,j-1}^{5\times 5}$, $p_{i-1,j+1}^{5\times 5}$, $p_{i+1,j-1}^{5\times 5}$, $p_{i+1,j+1}^{5\times 5}$.

11. The method of claim 9, wherein said one-dimensional pyramid filters comprise a sequence of scalable cascaded multiplierless operational units, each of said operational units capable of producing a different order pyramid filtered output signal sample stream.

12. An article comprising: a storage medium, said storage medium having stored thereon instructions, that, when executed result in filtering an image using a two-dimensional pyramid filter architecture of order 2N−1, the two-dimensional pyramid filter architecture of order 2N−1 including one-dimensional pyramid filters of order 2N−1, where N is a positive integer greater than three, by:
summing, on respective clock cycles of said two dimensional pyramid filter architecture, the following:
pyramid filtered output signals corresponding to output signals produced by four one-dimensional pyramid filters of order 2N−1; and
a pyramid filtered output signal corresponding to the summation of signal sample matrices of order [2(N−1)−1].

13. The article of claim 12, wherein N is four; and
wherein the signal sample matrices comprise four signal sample matrices $p_{i-1,j-1}^{5\times 5}$, $p_{i-1,j+1}^{5\times 5}$, $p_{i+1,j-1}^{5\times 5}$, $p_{i+1,j+1}^{5\times 5}$.

14. The article of claim 12, wherein said one-dimensional pyramid filters comprise a sequence of scalable cascaded multiplierless operational units, each of said operational units capable of producing a different order pyramid filtered output signal sample stream.

15. An image processing system comprising:
an image processing unit to filter scanned color images;
said image processing unit including at least one two-dimensional pyramid filter architecture;
said at least one two-dimensional pyramid filter architecture comprising:
a two-dimensional pyramid filter architecture of an order 2N−1, where N is a positive integer greater than three, the two-dimensional pyramid filter architecture of order 2N−1 including one-dimensional pyramid filters of order 2N−1;
said two dimensional pyramid filter architecture of order 2N−1, in operation, capable of producing, on respective clock cycles, at least the following:

a pyramid filtered output signal corresponding to the summation of output signals produced by four one-dimensional pyramid filters of order 2N−1; and a pyramid filtered output signal corresponding to the summation of signal sample matrices of order [2(N−1)−1];

wherein the respective pyramid filtered output signals in said two dimensional pyramid filter architecture are summed on respective clock cycles of said two dimensional pyramid filter architecture.

16. The system of claim 15, wherein N is four; and wherein the signal sample matrices comprise four signal sample matrices $p_{i-1,j-1}^{5 \times 5}$, $p_{i-1,j+1}^{5 \times 5}$, $p_{i+1,j-1}^{5 \times 5}$, $p_{i+1,j+1}^{5 \times 5}$.

17. The system of claim 15, wherein said one-dimensional pyramid filters comprise a sequence of scalable cascaded multiplierless operational units, each of said operational units capable of producing a different order pyramid filtered output signal sample stream.

* * * * *